(12) United States Patent
Bastide et al.

(10) Patent No.: US 8,904,293 B2
(45) Date of Patent: Dec. 2, 2014

(54) MINIMIZING DELAYS IN WEB CONFERENCE SWITCHES BETWEEN PRESENTERS AND APPLICATIONS

(75) Inventors: Paul Roger Bastide, Boxford, MA (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 12/797,365

(22) Filed: Jun. 9, 2010

(65) Prior Publication Data

US 2011/0307805 A1 Dec. 15, 2011

(51) Int. Cl.
*G06F 3/00* (2006.01)
*H04M 7/00* (2006.01)
*H04M 3/56* (2006.01)
*H04L 12/18* (2006.01)
*G06Q 10/10* (2012.01)

(52) U.S. Cl.
CPC ............ *H04M 3/567* (2013.01); *H04M 7/0027* (2013.01); *H04L 12/1822* (2013.01); *H04M 2201/14* (2013.01); *G06Q 10/10* (2013.01)
USPC .......................................................... 715/753

(58) Field of Classification Search
CPC .................................................... G06Q 10/10
USPC .......................................... 709/204; 715/753
See application file for complete search history.

(56) References Cited

U.S. PATENT DOCUMENTS

| | | | |
|---|---|---|---|
| 6,532,218 B1 * | 3/2003 | Shaffer et al. ................. | 370/260 |
| 6,668,273 B1 | 12/2003 | Rust | |
| 6,760,749 B1 | 7/2004 | Dunlap et al. | |
| 7,006,055 B2 | 2/2006 | Sukthankar et al. | |
| 7,379,968 B2 * | 5/2008 | Schuh ............................ | 709/204 |
| 7,516,179 B2 | 4/2009 | Huck et al. | |
| 7,533,146 B1 | 5/2009 | Kumar | |
| 7,792,262 B2 * | 9/2010 | Parker ...................... | 379/202.01 |
| 7,957,273 B2 * | 6/2011 | Rao et al. ....................... | 370/229 |
| 2003/0086403 A1 * | 5/2003 | Harris et al. ................... | 370/338 |
| 2003/0091000 A1 * | 5/2003 | Chu et al. ....................... | 370/230 |
| 2003/0093585 A1 | 5/2003 | Allan | |
| 2005/0198139 A1 | 9/2005 | Malkin et al. | |
| 2005/0273510 A1 * | 12/2005 | Schuh ........................... | 709/225 |
| 2006/0149815 A1 * | 7/2006 | Spradling et al. ............. | 709/205 |
| 2006/0153217 A1 * | 7/2006 | Chu et al. ....................... | 370/412 |
| 2006/0245566 A1 * | 11/2006 | Parker ...................... | 379/202.01 |

(Continued)

OTHER PUBLICATIONS www.mikogo.com/products/features, p. 2, "Multiple Meeting Participates" and "Switch Presenter".

*Primary Examiner* — William Bashore
*Assistant Examiner* — Henry Orr
(74) *Attorney, Agent, or Firm* — Charles L. Moore; Moore & Van Allen PLLC

(57) ABSTRACT

A method for minimizing delays in web conference switches between presenters and applications may include receiving a key frame of content selected by a user for sharing in response to the user being a presenter and having content to share. The method may also include storing the key frame of the selected content in a buffer in response to the user not being a current presenter. The method may additionally include sharing the key frame of the content with participants of the web conference, by the processing device, in response to an indication that a previous presenter has completed his presentation and the user being a next presenter in a presenter queue.

17 Claims, 3 Drawing Sheets

(56) References Cited

U.S. PATENT DOCUMENTS

| | | |
|---|---|---|
| 2008/0005233 A1 | 1/2008 | Cai et al. |
| 2008/0005244 A1* | 1/2008 | Vernon et al. ............... 709/204 |
| 2008/0126953 A1 | 5/2008 | Davidson et al. |
| 2009/0055234 A1* | 2/2009 | Li et al. ............................ 705/8 |
| 2009/0234721 A1 | 9/2009 | Bigelow et al. |
| 2009/0303998 A1* | 12/2009 | Rao et al. ...................... 370/392 |
| 2010/0037151 A1 | 2/2010 | Ackerman et al. |
| 2010/0169951 A1* | 7/2010 | Vaughan et al. ................. 726/3 |
| 2011/0093611 A1* | 4/2011 | Lind et al. .................... 709/236 |
| 2011/0246885 A1* | 10/2011 | Pantos et al. .................. 715/716 |

* cited by examiner

MINIMIZING DELAYS IN WEB CONFERENCE SWITCHES BETWEEN PRESENTERS AND APPLICATIONS

BACKGROUND

Aspects of the present invention relate to conferencing over a network or web conferencing, and more particularly to a method, system and computer program product for minimizing delays in web conference switches between presenters and applications that may be used as part of the web conference.

Web conferencing has become a widely used tool or application for holding meetings, particularly when meeting participants or attendees are located in different geographic locations. Participants can attend or participate in the meeting from their own office or other convenient location and do not have the expense and time involved in having to travel to a remote location. Web conferencing applications include features for sharing presentations in different presentation applications or formats, such as for example Microsoft Power Point, IBM Lotus Symphony or other similar presentation applications. Microsoft and Power Point are trademarks of Microsoft Corporation in the United States, other countries or both. IBM and Lotus Symphony are trademarks of International Business Machines, Inc., in the United States, other countries or both. During a web conference, there may be a delay or time lag while transitioning or switching between presenters and applications resulting in loss of time for all participants. This situation may be exacerbated where the presenters are also in different geographic locations.

BRIEF SUMMARY

According to one aspect of the present invention, a method for minimizing delays in web conference switches between presenters and applications may include receiving a key frame of content selected by a user for sharing in response to the user being a presenter and having content to share. The method may also include storing the key frame of the selected content in a buffer in response to the user not being a current presenter. The method may additionally include sharing the key frame of the content with participants of the web conference, by the processing device, in response to an indication that a previous presenter has completed his presentation and the user being a next presenter in a presenter queue.

According to another aspect of the present invention, a system for minimizing delays in web conference switches between presenters and applications may include a processor. The system may also include a module, operating on the processor, for minimizing delays in web conference switches between presenters and applications. The module may also include a module to receive a key frame of content selected by a user for sharing in response to the user being a presenter and having content to share. A buffer may store the key frame of the selected content in response to the user not being a current presenter.

According to a further aspect of the present invention, a computer program product for minimizing delays in web conference switches between presenters and applications may include a computer readable storage medium having computer readable program code embodied therewith. The computer readable program code may also include computer readable program code configured to receive a key frame of content selected by a user for sharing in response to the user being a presenter and having content to share. The computer readable program code may additionally include computer readable program code configured to store the key frame of the selected content in a buffer in response to the user not being a current presenter. The computer readable program code may further include computer readable program code configured to share the key frame of the content with participants of the web conference in response to an indication that a previous presenter has completed his presentation and the user being a next presenter in a presenter queue.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1A:
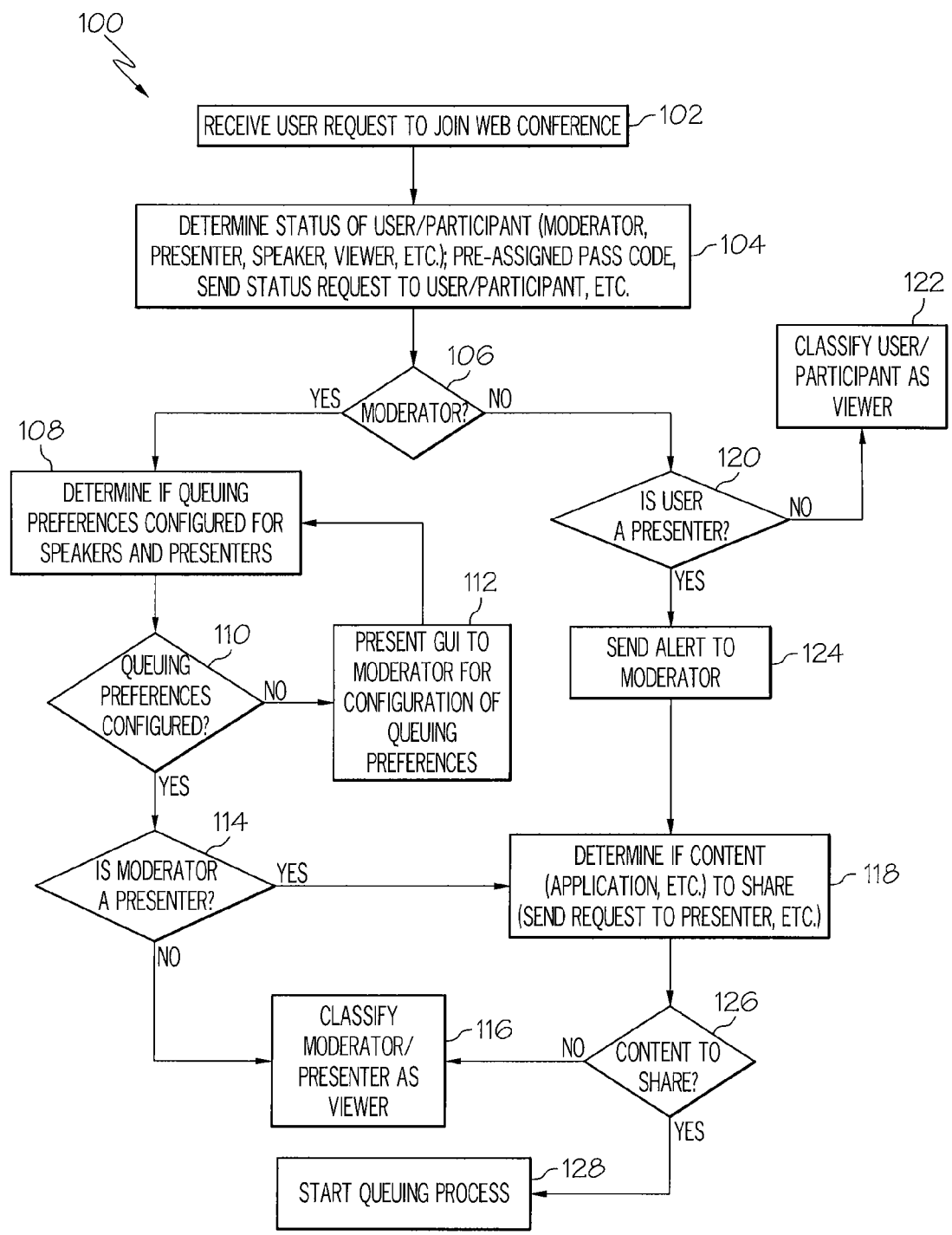
FIGS. 1A and 1B are a flowchart of an example of a method for minimizing delay in web conference switches between presenters and applications in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
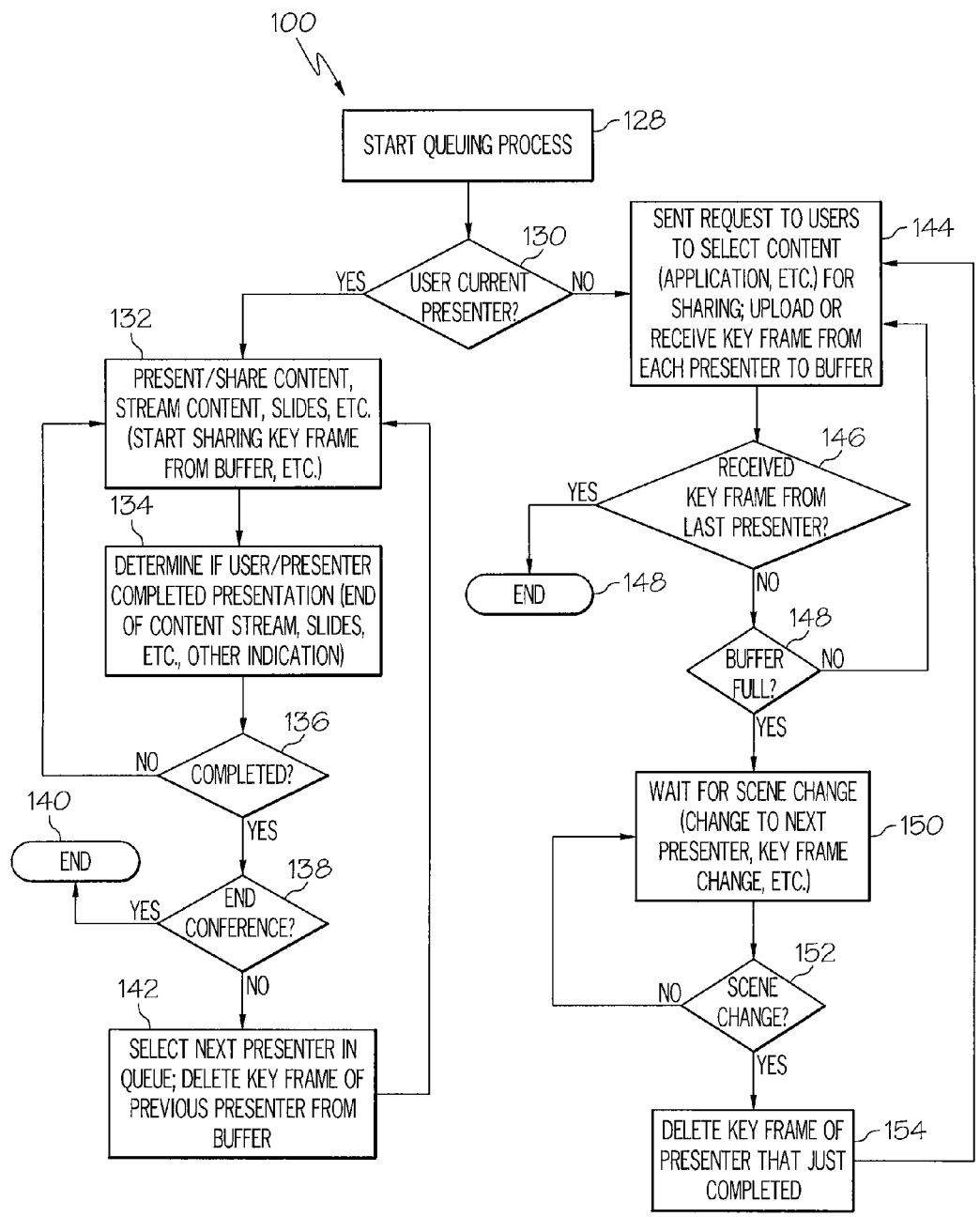

FIGS. 1A and 1B are a flowchart of an example of a method 100 for minimizing delay in web conference switches between presenters and applications in accordance with an embodiment of the present invention. In block 102, a request may be received from a user or participant to join a web conference.

In block 104, a status or classification of the user or participant may be determined. Examples of the status or classification of a user or participant may be a moderator, a presenter, a speaker, a viewer or similar classification or status. A moderator may be the person or participant in charge who is managing or controlling the web conference. A presenter is a participant that will be making a presentation or sharing content. Content may include but is not necessarily limited to slides, video or other multi-media content. A speaker may be a participant who will speak but will not necessarily be sharing any content or presenting materials electronically. A viewer may be a participant who is not expected to share content or address the other participants as a speaker.

An example of one procedure for determining the status or classification of each user or participant may be to pre-assign a pass code to each participant. The participant is requested to enter or provide the pass code before the participant can join the web conference. The pass code may include an indication of the status or classification of the participant. Accordingly, the participant may be automatically classified as to the type of participant from the participant's pass code.

Another example of a procedure that may be used for determining the status or classification of the user or participant may include sending a status or classification request to the user or participant at the time the participant is attempting to join the web conference. For example, a dialog box, menu or other mechanism may be sent to the participant by the web conferencing application, server or host requesting the participant to enter or select in the dialogue box or menu the status or classification of the participant.

In block 106, a determination may be made whether the participant is the moderator of the web conference. If the participant is the moderator, the method 100 may advance to block 108. In block 108, a determination may be made if queuing preferences have been configured for the presenters and speakers. In block 110, if queuing preferences have not been configured, the method 100 may advance to block 112. In block 112, a graphical user interface (GUI) may be presented to the moderator for selecting or entering the queuing preferences. Examples of the queuing preferences may include specifying an order of the presenters or speakers, specifying a number of available buffers for the presenters or speakers, for example, buffers for the current speaker and the next two speakers and any other preferences that may be desired.

If queuing preferences have been configured in block 110, the method 100 may advance to block 114. In block 114, a determination may be made whether the moderator is also a presenter. If the moderator is not a presenter, the method 100 may advance to block 116. In block 116, the moderator may also be classified as a viewer.

If the moderator is also a presenter in block 114, the method 100 may advance to block 118. In block 118, a determination may be made if content is to be shared with the other participants of the web conference. A request may be sent to the moderator to determine if the moderator has content to share. The request may include a GUI including a check box in which the moderator indicates whether or not he has content to share.

In block 126, if there is no content being shared, the method 100 may advance to block 116, and as previously described the moderator or presenter may be classified as a viewer. If there is content to be shared in block 126, the method 100 may advance to block 128 and a queuing process may be started. The queuing process will be described in more detail with reference to FIG. 1B.

Returning to block 106, if the participant is not the moderator, the method 100 may advance to block 120. In block 120, a determination may be made if the user or participant is a presenter. If the user is not a presenter, the user or participant may be classified as a viewer and block 122. If the user is a presenter, the method 100 may advance to block 124. In block 124, an alert may be sent to the moderator to indicate or classify the participant as a presenter.

In block 118, as previously described, if the participant is a presenter, a determination may be made if the presenter has content to share. If the presenter has no content to share in block 126, the presenter may be classified as a viewer in block 116. If the presenter has content to share in block 126, the queuing process may be started in block 128.

Referring to FIG. 1B, the queuing process starts at block 128. In block 130, a determination may be made if the user or participant is the current presenter. If the user or participant is the current presenter, the method 100 may advance to block 132.

In block 132, the content of the presenter may be presented or shared. The content may be streamed to the other participants. As previously described the content may include slides, video, multimedia or other applications. As described in more detail herein starting to share the content may include sharing a key frame which has been temporarily stored in a buffer of a web conferencing host or server.

In block 134, a determination may be made if the user or presenter has completed his presentation. The determination that the user or presenter has completed his presentation may be determined by the content stream, slides or other application having ended or by some other indication. For example, the presenter may operate a feature of a GUI to send an indication to the web conferencing server or host that he has completed his presentation. The presenter may simply advise the moderator that he has completed his presentation or sharing content and the moderator may take the appropriate actions to provide an indication that the presentation has been completed. In block 136, if the presenter has not completed his presentation, the method 100 may return to block 132 and the content may continue to be streamed and shared with the other participants.

If a determination is made in block 136 that the presentation has ended, the method 100 may advance to block 138. In block 138 a determination may be made whether the web conference has ended. This may be determined by the moderator providing some indication to the web conferencing host or server that the web conference is over or is to be terminated. If the web conference has ended in block 138, the method 100 may end or terminate at block 140. If the web conference has not ended in block 138 the method 100 may advance to block 142.

In block 142, the next presenter in the queue may be selected and the key frame of the previous presenter may be deleted from the buffer associated with the web conferencing host or server. The method 100 may then return to block 132 and the method 100 may proceed similar to that previously described.

Returning to block 130, if a determination is made in block 130 that the user or participant is not the current presenter, the method 100 may advance to block 144. In block 144, a request may be sent to each of the users who are classified as a presenter and have content to share to select the content they intend to share with the other participants during the web conference. A GUI or dialogue box may be presented to each user who is a presenter to identify the content on their computer system or client for uploading and sharing during the presenter's presentation. A key frame from each presenter may be uploaded or received by the web conferencing server and stored in a buffer associated with the web conferencing host or web conferencing server. A key frame may be defined as the frame at the start or end of a smooth motion, often occurring during a scene change of, for example, video or continuous streaming of an image. For example, a line moving from a horizontal position to a vertical position in normal animation or filmmaking multiple snapshots or frames would be used to show this motion. The key frames only show the start at the horizontal position and the end at the vertical position.

In block 146 a determination may be made if a key frame has been received from the last presenter. If the key frame has been received from the last presenter, the queuing process may end or terminate at termination 148. If the key frame from the last presenter has not been received, the method 100 may advance to block 148.

In block 148 a determination may be made whether the buffer is full. If the buffer is not full, the method 100 may return to block 144 and a key frame may be uploaded or received from another presenter or from the next presenter in a presenter queue associated with the web conferencing host or server.

If the buffer is full in block 148, the method 100 may advance to block 150. In block 150, the method 100 may wait or delay for a scene change and deletion of a previous presenter's key frame before uploading or receiving another key frame for another presenter. The scene change may be a change or switch to the next presenter in the presenter queue, a key frame change or deletion of a key frame from the buffer or some other event that will provide capacity in the buffer for uploading or receiving another key frame for another presenter.

In block 152, a determination may be made if there has been a scene change. If there has not been a scene change, the method 100 may return to block 150 and the method will continue to wait for the next scene change. If there has been a scene change in block 152, the method 100 may advance to block 154. In block 154, the key frame of the presenter that just completed his presentation may be deleted from the buffer. The method 100 may then return to block 144 and a request may be sent to the next presenter to be placed in the presenter queue to designate or select the content the presenter intends to share. The key frame of the presenter's presentation may then be uploaded to the buffer or received by the buffer or server. The method 100 may then continue similar to that previously described.

Figure 2:
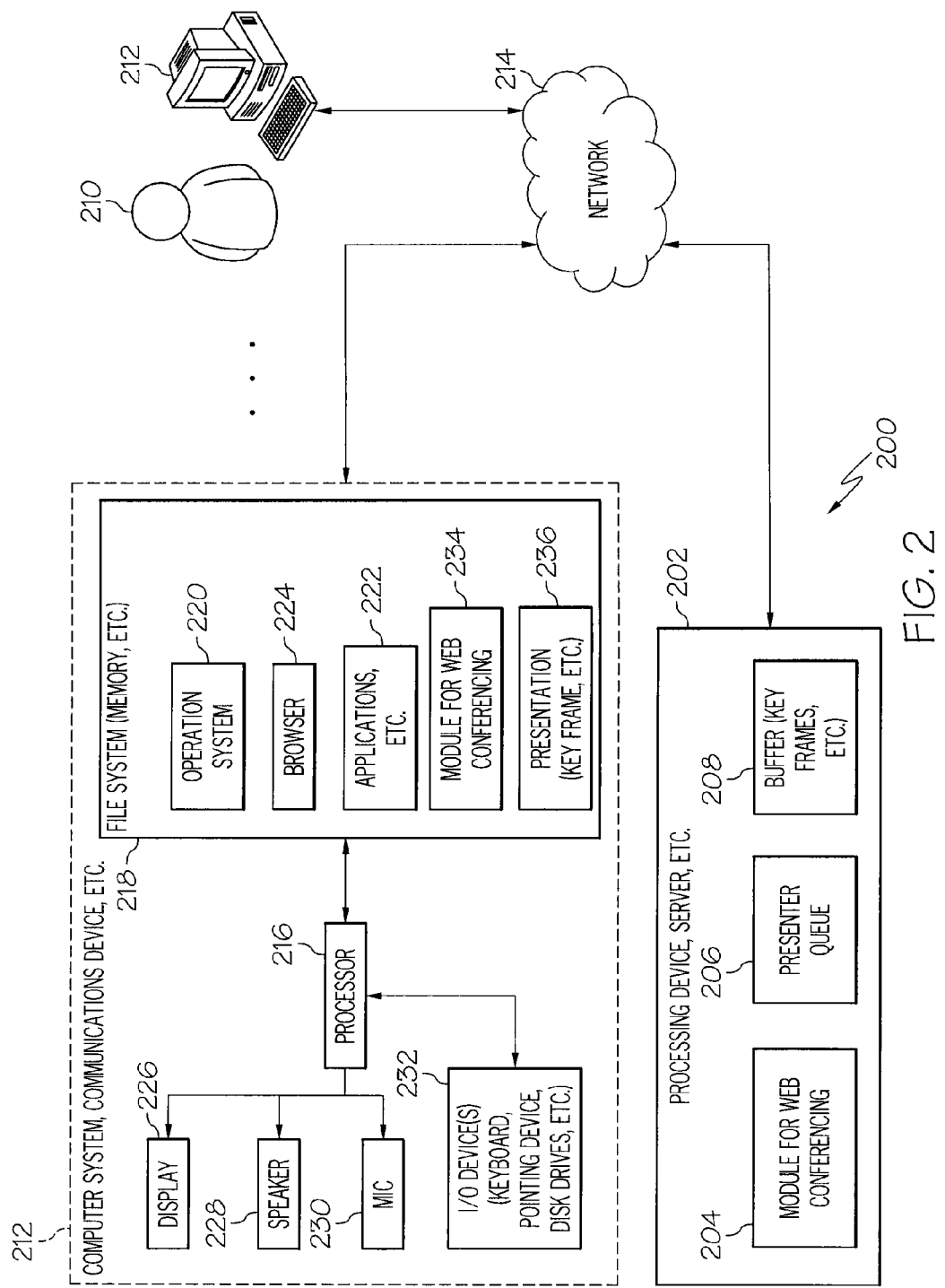
FIG. 2 is a block schematic diagram of an example of a system for minimizing delay in web conference switches between presenters and applications in accordance with an embodiment of the present invention.

FIG. 2 is a block schematic diagram of an example of a system 200 for minimizing delay in web conference switches between presenters and applications in accordance with an embodiment of the present invention. The method 100 of FIGS. 1A and 1B may be embodied in or performed by the system 200. The system 200 may include a processing device 202. The processing device 202 may be a web conference server or similar processing device for hosting the web conferencing service. A module 204 for web conferencing may be operable on the processing device 202. The module 204 may be stored on a file system of the processing device 202. Portions of or all of the method 100 may be embodied in or performed by the module 204.

A presenter queue 206 may also reside on the processing device 202 or server or may be a separate component associated with the processing device 202. The presenter queue 206 may include a sequential order of the presenters. The presenter queue may also track the presenters who have completed their presentations and those presenters that still remain.

A buffer 208 or similar storage device may reside on the processing device 202 or may be a separate component associated with the processing device 202. Similar to that previously described, the buffer 208 may store a key frame of each presenters content or presentation or may store some other portion of each presenter's content or presentation so as to substantially minimize a time delay when switching between presenters or applications or transitioning from one presenter or application to another.

A user or web conference participant 210 may use a computer system 212 to access the processing device 202 or web conferencing server and module 204 via a network 214. The computer system 212 may be any type of communications device including mobile communications devices or the like capable of performing the functions or operations described herein. The network 214 may be the Internet, an intranet or other private or proprietary network. The computer system 212 may include a processor 216 to control operation of the computer system 212 and a file system 218, memory or similar data storage device. An operating system 220, applications 222 and other programs may be stored on the file system 218 for running or operating on the processor 216. A web or Internet browser 224 may also be stored on the file system 218 for accessing the processing device 216 or web conferencing server via the network 214 for participating in a web conference, and if the user is a presenter, sharing content as described herein.

The computer system 212 may also include a display 226 for presenting the content being shared or streamed by the web conference server 202. The computer system 212 may also include a speaker system 228 for receiving audio content from the web conference server 202. The computer system 212 may additionally include a microphone 230 for the user 210 to communicate with the moderator and other participants and to make his presentation if a presenter.

The computer system 212 may further include one or more input devices, output devices or combination input/output devices, collectively I/O devices 232. The I/O devices 232 may include a keyboard, pointing device, such as a mouse, disk drives and any other devices to permit a user, such as user 210, to interface with and control operation of the computer system 212 and to access the web conferencing server 202.

In accordance with an embodiment, a client module 234 for web conferencing may be stored on the file system 218 of the computer system 212 and operable on the processor 216. The client web conferencing module 234 may operate in conjunction with the web conferencing module 204 on the server 202 for participation by user 210 in the web conference and to provide the features and functions described herein.

If the user is a presenter, the user's presentation 236 and presentation application may be stored on the file system 218. The presentation 236 or presentation application may include a key frame for uploading to the buffer 208 of the server 202 similar to that described herein. The key frame may then be streamed to the other participants during any switch or transition between users or applications similar to that previously described. The presentation content may then be streamed for sharing with the other participants.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for minimizing delays in web conference switches between presenters and applications, the method comprising:

sending, by a processing device, a request to each user of a plurality users that are presenters having content to share and in response to the presenters not being a current presenter, the request requesting each presenter that is not the current presenter to select the content to share on their computer system;

receiving, by the processing device, a key frame of the content selected by each presenter for sharing in response to each presenter selecting the content to share;

receiving, by the processing device, the key frame of the content selected by each presenter for sharing in response to each presenter selecting the content to share;

storing the key frame of the selected content of each presenter, by the processing device, in a buffer in response to the presenter not being the current presenter;

sharing the key frame of the content in the buffer of the presenter that is a next presenter in a presenter queue with participants of the web conference, by the processing device, in response to an indication that a previous presenter has completed his presentation and the presenter being the next presenter in the presenter queue, sharing the key frame of the content in the buffer causing minimal delay in switching between presenters and applications during the web conference;

streaming the selected content of the current presenter, by the processing device, to the participants after sharing the key frame of the selected content; and deleting the key frame of the selected content of the previous presenter from the buffer after the previous presenter completes his presentation.

2. The method of claim 1, further comprising:
determining if the buffer is full;
receiving the key frame of the selected content from any other presenter and storing the key frame in the buffer in response to the buffer not being full; and
waiting for a scene change, in response to the buffer being full, and the key frame of the previous presenter to be deleted from the buffer before receiving the key frame of the selected content from any other presenter and storing the key frame in the buffer, wherein the scene change comprises at least one of the previous presenter having completed his presentation, the next presenter beginning his presentation, and starting to share the key frame of the content of the next presenter.

3. The method of claim 1, further comprising determining a status of each participant of the web conference as each participant joins the web conference.

4. The method of claim 3 wherein determining the status of each participant comprises determining if the participant is one of a moderator, one of the presenters, a speaker and a viewer.

5. The method of claim 3, wherein determining the status of each participant comprises reading a pass code pre-assigned to each participant, wherein the pass code comprises an indication of the status of the participant.

6. The method of claim 3, wherein determining the status of each participant comprises sending a request to each participant for the participant to designate the status of the participant as one of a moderator, one of the presenters, a speaker and a viewer.

7. The method of claim 1, further comprising:
determining if a participant of the web conference is a moderator of the web conference; and
presenting a graphical user interface for the moderator to configure any queuing preferences for each speaker and presenter in response to queuing preferences not having been configured.

8. The method of claim 7, further comprising:
determining if the moderator is one of the presenters;
determining if the moderator has content to share in response to the moderator being one of the presenters; and
receiving the key frame of the content for sharing with the participants of the web conference in response to the moderator having content to share.

9. The method of claim 1, further comprising:
determining if a participant of the web conference is one of the presenters; and
sending an alert to a moderator of the web conference in response to the participant having a presenter status.

10. The method of claim 9, further comprising:
determining if the presenter has content to share; and
starting a queuing process in response to the presenter having content to share.

11. A system for minimizing delays in web conference switches between presenters and applications, the system comprising:
a processor;
a module, operating on the processor, for minimizing delays in web conference switches between presenters and applications, the module comprising:
a module for sending a request to each user of a plurality users that are presenters having content to share and in response to the presenters not being a current presenter, the request requesting each presenter that is not the current presenter to select the content to share on their computer system;
a module for receiving a key frame of the content selected by each presenter for sharing in response to each presenter selecting the content to share;
a module to receive the key frame of the content selected by each presenter for sharing in response to each presenter selecting the content to share; and
a buffer for storing the key frame of the selected content of each presenter in response to the presenter not being a current presenter, wherein the module shares the key frame of the selected content in the buffer of the presenter that is a next presenter in a presenter queue with participants of the web conference in response to an indication that a previous presenter has completed his presentation and the presenter is the next presenter in the presenter queue, sharing the key frame causing minimal delay in switching between presenters and applications during the web conference;
a module operating on the processor to stream the selected content of the current presenter to the participants after sharing the key frame of the selected content; and
a module operating on the processor to delete the key frame of the selected content of the previous presenter from the buffer after the previous presenter completes his presentation.

12. The system of claim 11, further comprising:
a module to determine if the buffer is full, wherein the key frame of the selected content from any other presenter is received and stored in the buffer in response to the buffer not being full; and
a module to detect a scene change, in response to the buffer being full, and the key frame of the previous presenter being deleted from the buffer before receiving the key frame of the selected content from any other presenter and storing the key frame in the buffer, wherein the scene change comprises at least one of the previous presenter having completed his presentation, the next presenter beginning his presentation, and starting to share the key frame of the content of the next presenter.

13. The system of claim 12, further comprising a module to determine a status of each participant of the web conference as each participant joins the web conference, wherein the status of each participant comprises one of moderator, presenter, speaker, and viewer.

14. A computer program product for minimizing delays in web conference switches between presenters and applications, the computer program product comprising:
a non-transitory computer readable storage medium having computer readable program code embodied therewith, the computer readable program code comprising:
computer readable program code configured to send a request to each user of a plurality users that are presenters having content to share and in response to the presenters not being a current presenter, the request requesting each presenter that is not the current presenter to select the content to share on their computer system;

computer readable program code configured to receive a key frame of the content selected by each presenter for sharing in response to each presenter selecting the content to share;

computer readable program code configured to receive the key frame of the content selected by each presenter for sharing in response to each presenter selecting the content to share;

computer readable program code configured to store the key frame of the selected content of each presenter in a buffer in response to the presenter not being a current presenter;

computer readable program code configured to share the key frame of the content in the buffer of the presenter that is a next presenter in a presentation queue with participants of the web conference in response to an indication that a previous presenter has completed his presentation and the presenter being the next presenter in the presenter queue, sharing the key frame of the content in the buffer causing minimal delay in switching between presenters and applications during the web conference;

computer readable program code configured to stream the selected content of the current presenter to the participants after sharing the key frame of the selected content; and computer readable program code configured to delete the key frame of the selected content of the previous presenter from the buffer after the previous presenter completes his presentation.

15. The computer program product of claim 14, wherein the computer readable program code further comprises computer readable program code configured to delete the key frame of the previous presenter in response to a scene change, wherein the scene change comprises at least one of the previous presenter having completed his presentation, the next presenter beginning his presentation, and starting to share the key frame of the content of the next presenter.

16. The computer program product of claim 14, wherein the computer readable program code further comprises:

computer readable program code configured to determine if the buffer is full computer readable program code configured to receive the key frame of the selected content from any other presenter and storing the key frame in the buffer in response to the buffer not being full; and computer readable program code configured to detect a scene change, in response to the buffer being full, and the key frame of the previous presenter to be deleted from the buffer before receiving the key frame of the selected content from any other presenter and storing the key frame in the buffer, wherein the scene change comprises at least one of the previous presenter having completed his presentation, the next presenter beginning his presentation, and starting to share the key frame of the content of the next presenter.

17. The method of claim 1, wherein storing the key frame of the content comprises storing the key frame of the content of each of the presenters in the presenter queue in the buffer.

* * * * *